(12) United States Patent
Bernardin et al.

(10) Patent No.: US 10,597,302 B2
(45) Date of Patent: Mar. 24, 2020

(54) REACTOR FOR PREPARING HYDROGEN CYANIDE BY THE ANDRUSSOW PROCESS, EQUIPMENT COMPRISING SAID REACTOR AND PROCESS USING SUCH AN EQUIPMENT

(71) Applicant: Arkema France, Colombes (FR)

(72) Inventors: Yves Bernardin, Thionville (FR); Xavier Marcarian, Billere (FR); Romain Billon, Carrieres sur Seine (FR)

(73) Assignee: ARKEMA FRANCE, Colombes (FR)

( * ) Notice: Subject to any disclaimer, the term of this patent is extended or adjusted under 35 U.S.C. 154(b) by 248 days.

(21) Appl. No.: 14/905,462

(22) PCT Filed: Jul. 18, 2014

(86) PCT No.: PCT/EP2014/065551
§ 371 (c)(1),
(2) Date: Jan. 15, 2016

(87) PCT Pub. No.: WO2015/007901
PCT Pub. Date: Jan. 22, 2015

(65) Prior Publication Data
US 2016/0152484 A1 Jun. 2, 2016

(30) Foreign Application Priority Data
Jul. 19, 2013 (FR) ...................................... 13 57133

(51) Int. Cl.
*C01C 3/02* (2006.01)
*B01J 8/02* (2006.01)
(Continued)

(52) U.S. Cl.
CPC ............. *C01C 3/0225* (2013.01); *B01J 4/001* (2013.01); *B01J 8/02* (2013.01); *B01J 8/025* (2013.01);
(Continued)

(58) Field of Classification Search
None
See application file for complete search history.

(56) References Cited

U.S. PATENT DOCUMENTS 2,584,080 A * 1/1952 Houpt .................... B01J 12/005
422/199
2,782,107 A * 2/1957 Inman .................... B01J 8/0453
422/198

(Continued)

FOREIGN PATENT DOCUMENTS

| DE | 549055 | 4/1932 |
| DE | 954957 | 12/1956 |
| WO | WO99/01211 | 1/1999 |

OTHER PUBLICATIONS

Ullmann's Encyclopedia of Industrial Chemistry; "Cyano Compounds, Inorganic"; 1987, vol. 8, pp. 161-162.

*Primary Examiner* — Wayne A Langel
(74) *Attorney, Agent, or Firm* — Thomas F. Roland

(57) ABSTRACT

The present invention relates to a reactor (201) for preparing hydrogen cyanide by the Andrussow process, to an equipment (200) comprising said reactor and to a process for preparing hydrogen cyanide by the Andrussow process. The reactor (201) comprising at least one gas inlet (I) for reactant gases mixture, a catalyst (203), a porous support for the catalyst (204), a porous sub support (205, 206) and at least one outlet (P8) for the reaction products. According to the invention, said reactor has a cone frustum shaped metallic casing (210) and comprises inside the metallic casing, a gas distributor (202) located between the gas inlet and the
(Continued)

Figure 1:
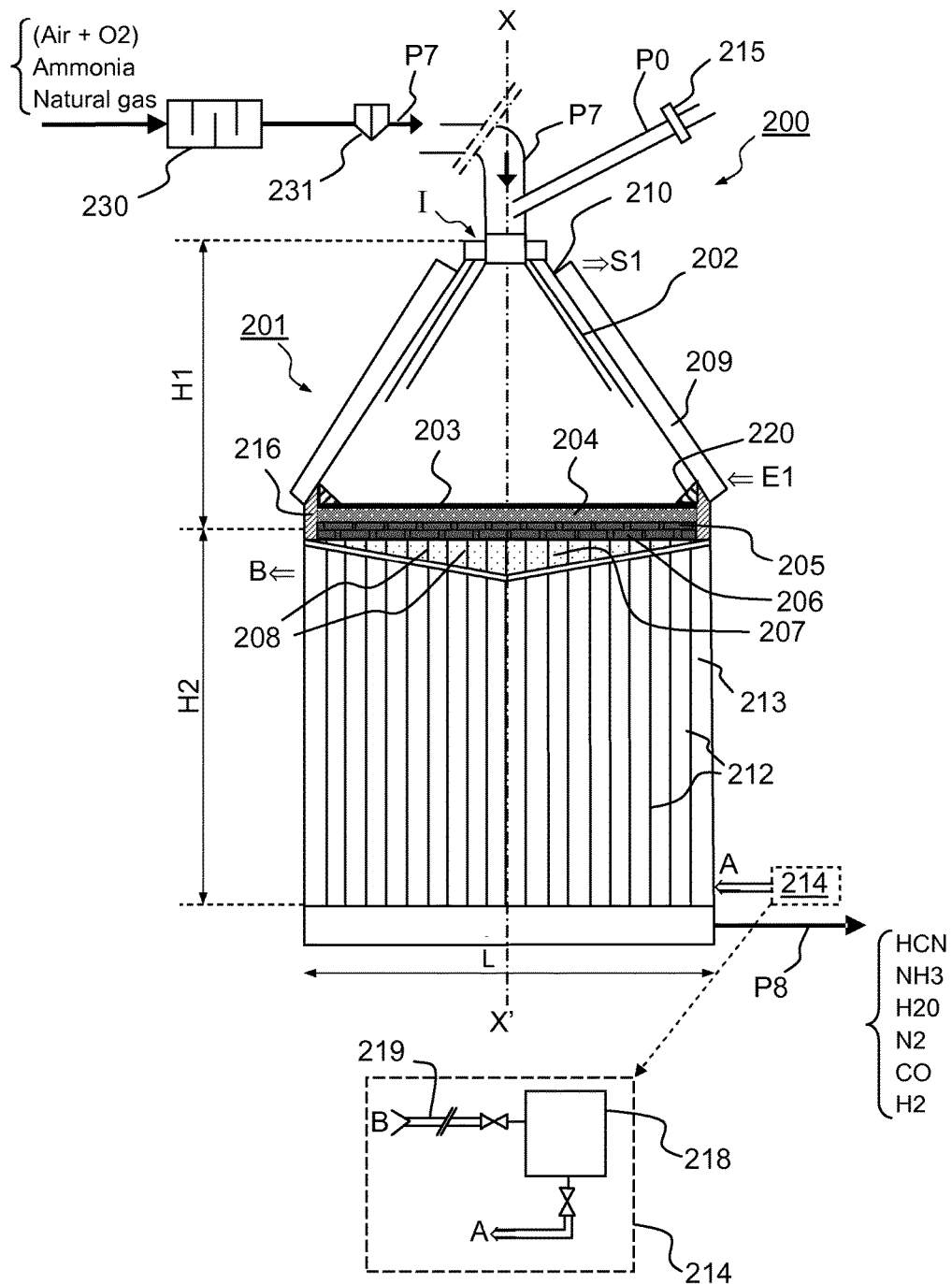

catalyst, said distributor comprising at least one cone frustum element (D1, ... Dn) having an upper base directed towards the gas inlet (I).

13 Claims, 3 Drawing Sheets

(51) Int. Cl.
  *B01J 12/00* (2006.01)
  *B01J 19/24* (2006.01)
  *B01J 4/00* (2006.01)

(52) U.S. Cl.
  CPC .......... *B01J 8/0278* (2013.01); *B01J 8/0285* (2013.01); *B01J 12/007* (2013.01); *B01J 19/2495* (2013.01); *B01J 2208/00212* (2013.01); *B01J 2208/00539* (2013.01); *B01J 2208/00884* (2013.01); *B01J 2219/0027* (2013.01); *B01J 2219/00033* (2013.01); *B01J 2219/00094* (2013.01); *B01J 2219/00263* (2013.01); *B01J 2219/00265* (2013.01); *B01J 2219/0286* (2013.01); *B01J 2219/1946* (2013.01); *C01C 3/0212* (2013.01)

(56) References Cited

U.S. PATENT DOCUMENTS

| | | | | | |
|---|---|---|---|---|---|
| 3,056,655 | A | * | 10/1962 | Inman | B01J 8/02 422/211 |
| 3,195,988 | A | * | 7/1965 | Roberts | B01J 8/0278 422/219 |
| 3,215,495 | A | * | 11/1965 | Andresen | B01J 8/02 422/211 |
| 3,545,939 | A | * | 12/1970 | Cox, Jr. | B01J 8/008 422/202 |
| 3,597,166 | A | * | 8/1971 | Hochman | B01J 4/001 138/39 |
| 3,715,193 | A | * | 2/1973 | Strelzoff | B01J 12/007 165/169 |
| 3,909,208 | A | * | 9/1975 | Boret | B01J 8/0214 422/218 |
| 3,948,610 | A | * | 4/1976 | Sutcliffe | B01J 8/0207 422/171 |
| 4,256,174 | A | * | 3/1981 | Yoshida | B01J 8/0285 165/159 |
| 5,242,882 | A | * | 9/1993 | Campbell | B01J 23/8913 423/403 |
| 6,092,921 | A | * | 7/2000 | Wentinck | B01J 8/0278 252/373 |
| 6,649,137 | B2 | * | 11/2003 | Bergeron | B01J 8/001 422/187 |
| 7,118,723 | B2 | * | 10/2006 | Maurer | C01B 21/26 423/392 |
| 8,133,458 | B2 | * | 3/2012 | Fareid | B01J 8/009 422/129 |
| 8,802,020 | B2 | | 8/2014 | Schaefer et al. | |
| 2002/0127166 | A1 | | 9/2002 | Bergeron et al. | |
| 2005/0188619 | A1 | * | 9/2005 | Rostrup-Nielsen | B01J 8/0285 48/198.7 |
| 2007/0113476 | A1 | * | 5/2007 | Thomas | B01B 1/005 48/198.7 |
| 2010/0098603 | A1 | * | 4/2010 | Fareid | B01J 8/009 422/600 |
| 2011/0171101 | A1 | | 7/2011 | Schaefer et al. | |
| 2015/0353371 | A1 | * | 12/2015 | Caton | B01F 5/0405 423/376 |
| 2016/0347622 | A1 | * | 12/2016 | Caton | C01C 3/0225 |

* cited by examiner

REACTOR FOR PREPARING HYDROGEN CYANIDE BY THE ANDRUSSOW PROCESS, EQUIPMENT COMPRISING SAID REACTOR AND PROCESS USING SUCH AN EQUIPMENT

This application claims benefit, under 35 U.S.C. § 119 or § 365 of PCT Application Number PCT/EP2014/065551 filed. Jul. 18, 2014; and. French Application Number FR 13.57133, filed Jul. 19, 2013.

FIELD OF THE INVENTION

The present invention relates to a reactor for preparing hydrogen cyanide (HCN) by the Andrussow process, to an equipment comprising said reactor and to a process for preparing HCN which is performed using said reactor and equipment.

STATE OF THE ART

Hydrogen cyanide HCN is the starting product for a number of organic and inorganic synthesis, leading for example to the following products: acetone cyanohydrin ACH, cyanuric chloride, adiponitrile, methionine, inorganic compounds such as sodium cyanide and the like, NTA (NiTriloAcetic acid) EDTA (EthyleneDiamineTetraAcetic acid) etc. . . . When acetone cyanohydrin ACH is synthesized, it is used for example for the preparation of alkyl methacrylates or methacrylic acids. So producing HCN is a step for industrial processes for obtaining in continuous manner either alkyl methacrylates or methacrylic acids, and each step of such processes has to be controlled very precisely in order to avoid stops due to safety problems related for example to deflagration risks.

Andrussow process is widely used for hydrogen cyanide (HCN) synthesis by ammoxidation of methane. The synthesis of HCN by the Andrussow process is described more particularly in Ullmann's Encyclopedia of Industrial Chemistry, Volume 8, VCH Verlagsgesellschaft, Weinheim 1987, page 161-162. Hydrogen cyanide is obtained by the action of ammonia on methane in the presence of air over a catalyst consisting of platinum-rhodium gauzes. The reaction between ammonia and methane is the following:

$$CH_4 + NH_3 \rightarrow HCN + 3H_2 \quad (1)$$

Such a reaction is endothermic. Therefore, in absence of oxygen, it is necessary to mix a large quantity of methane compare to ammonia in order to burn the mixture and bring heat to enable the establishment of the reaction inside the reactor. The addition of air enables, thanks to the combustion of part of the hydrogen produced and excess of methane, to have a generally exothermic system and thus maintain the reaction synthesis without external energy. For that, the three reactant gases ($CH_4$, $NH_3$ and air) are mixed on acute proportions. The resulting gas stream is introduced into an Andrussow type reactor. This reactor comprises catalyst gauzes made of platinum-rhodium placed on a support. A heat exchanger is placed downstream of the reactor for cooling the gas immediately after contact with the catalyst gauzes. The initiation of the reaction is carried out with an electrical resistance which lights the gauzes. Once this ignition achieved, overall exothermic reactions maintains the gauzes at a temperature of about 750° C. to 1250° C., preferably 1000° C. to 1200° C.

The main reaction inside the reactor is the following:

$$CH_4 + NH_3 + 3/2 O_2 \rightarrow HCN + 3H_2O \quad (2)$$

The mixture of air, methane-containing gas and ammonia is a flammable mixture and the exothermic reaction can lead to an explosion if the proportions of the reactant gases in the mixture are not precisely controlled and if the temperature of the mixture and the reaction is not controlled.

A broad spectrum of possible embodiments of the Andrussow process is described in DE 549 055. Accordingly, reactors are also known for preparing HCN by the Andrussow process, one example of such a reactor being detailed in EP 1 001 843 B1. These reactors generally comprise an inlet for the reactants, an outlet for the products and a catalyst, which may be configured, for example, in the form of a plurality of platinum meshes arranged in succession. Immediately above the catalyst mesh, a gas-permeable protective layer may be provided, which serves as a heat shield and as a flashback guard.

The patent application WO09013035 discloses a reactor (1) for preparing HCN by Andrussow process comprising reactor vessel (2), at least one gas inlet (3) which opens into a gas inlet region (4), an outlet for the reaction products (5) and a catalyst (6), wherein at least one mixing element (7) and at least one gas-permeable intermediate layer (8) are provided within the reactor vessel (2) between the gas inlet region (4) and the catalyst (6), the mixing element (7) being arranged between the gas inlet region (4) and the gas-permeable intermediate layer (8). The gas-permeable intermediate layer (8) serves as protective layer and particularly as a heat shield and as a flashback guard. This reactor needs a gas-permeable intermediate layer to prevent against flashback gas and radiation damaging that may occur. Such a gas-permeable intermediate layer leads to a pressure drop. Moreover the mixing element comprises a plurality of impervious plates which also contributes to a pressure drop. The gas-permeable intermediate layer and the static mixing plates are perpendicularly to the gas inlet stream. The consequence of such an arrangement is a higher compression and so a higher consumption on energy than in the described reactor according to the invention.

The document WO2008/105669 discloses a process for the production of cyanides. The involved reactor comprises all perforated distribution plates. The first of the distribution plates directly after the reactor inlet is a cone and not a frustum cone. The last distribution plate acts also as a heat radiation shield. Such an alignment of distribution plates will lead to a large pressure drop in the cone of the reactor.

Indeed, despite disclosure of the prior art, there is a continuing need to provide an equipment and a process for the preparation of hydrogen cyanide by the Andrussow process which enables particularly to improve the yield, the production output (kg of HCN/h) in safety conditions. At the same time, the equipment for preparation of HCN should be simple and inexpensive and the catalyst lifetime should be increased. In addition, it was consequently an object of the present invention to provide an equipment for safety production HCN which prevents against damage due to thermal radiation and prevents against over pressurizing and over gas flashback. As a result the proposed reactor and equipment have an improved yield and are completely safe with lower risk of explosion.

TECHNICAL PROBLEM

Present invention aims to avoid at least one of the inconvenient of the state of the art. More particularly, the invention aims to propose a reactor for the preparation of hydrogen cyanide by the Andrussow process, increasing the yield of an Andrussow type reactor, by improving the mixing of reactant gases mixture.

Another aims of the invention is to provide a reactor for the preparation of hydrogen cyanide by the Andrussow process in order to improve safety of a continuous industrial process, to avoid emergency shutting down and any explosion and to produce HCN in safe and efficient manner.

Another aim of the invention is to provide an equipment using said reactor and a process for the preparation of hydrogen cyanide by the Andrussow process, using said reactor or equipment.

BRIEF DESCRIPTION

These object and further objects which are not stated explicitly but which are immediately derivable or discernible from the connections discussed herein by way of introduction are achieved by a reactor having all features of Claim 1. Appropriate modifications to the equipment according to the invention are protected in subclaims.

Surprisingly the yield of a reactor of Andrussow type reactor has being increased according to invention, by changing the shape of the reactor and of the mixing element for the reactant gas. According to the invention the reactor has or comprises a cone frustum shaped metallic or ceramic casing and inside the metallic or ceramic casing, at least one cone frustum element is provided as gas distributor for reactant gases. The cone frustum element is preferably made out of metal and advantageously out of stainless steel.

Accordingly, the present invention provides a reactor for preparing hydrogen cyanide by the Andrussow process, said reactor comprising at least one gas inlet for reactant gases mixture, a catalyst, at least one support for the catalyst and at least one outlet for the reaction products, wherein said reactor has or comprises a cone frustum shaped casing and comprises inside the metallic or ceramic casing, a gas distributor located between the gas inlet and the catalyst, and in which said distributor comprises at least one cone frustum element having a top base directed towards the gas inlet. Preferably the distributor comprises at least two cone frustum elements having a top base directed towards the gas inlet. The cone frustum shaped casing of the reactor is its upper part comprising the gas distributor.

The conic shape of the reactor, the casing and gas distributor, increase the yield by improving homogeneous distribution on catalyst surface compared with a cylindrical shape.

Advantageously, the reactor is a cone frustum shaped with cylindrical bases. Said reactor has advantageously a metallic or ceramic casing.

According to another feature of the invention, the gas distributor comprises at least one cone frustum element having a top base directed towards the gas inlet. The conical shape of the gas distributor improve the gas mixing and do not lead to a pressure drop as important as encountered with the reactor disclosed in WO09013035 where the plates static mixer is constituted by a plurality of impervious plates located perpendicularly to the gas inlet stream upward to the catalyst.

Preferably, the gas distributor comprises a plurality of coaxial cone frustum elements being arranged around each other with a central cone frustum element so that the diameter of the base of each element is increasing viewed in the direction of gas flow. The central cone frustum element has an height h1, the outer cone frustum element has an height hn, and intermediate elements have respectively height h2, . . . , h(n−1), where h1 is smaller than h2, and respectively h(n−1) is smaller than hn.

Advantageously, the cone frustum elements are fixed to each other and to the casing of the reactor so as to be spaced by a predetermined distance contributing to obtaining the gas distribution.

According to another feature of the reactor, the reactor comprises a safety device to avoid internal over pressurizing.

Advantageously, the safety device comprises a rupture disk and an outer pipe, the rupture disk being located at the end of the outer pipe, said outer pipe being connected above the gas input of the reactor, and said rupture disk being preferably set for a maximum pressure of 0.5 to 3 bar above operating pressure of the reactor.

According to another feature of the reactor for preparing hydrogen cyanide, the upper part of the reactor: the Andrussow type reactor comprises a cooling water jacket preferably a double wall cooling around the cone frustum shaped casing of the reactor to protect metallic or ceramic casing of the reactor from catalyst heat radiation. The cooling is necessary in order to avoid the deformation of cone and in worst case leakage outside the cone and inflammation of the gaz. The temperature of the catalyst goes over 1000° C. Indeed, the exothermic reactions maintain the catalyst temperature about 1000° C. to 1200° C.

Advantageously, the reactor comprises, a porous support for the catalyst, a porous sub support, a refractory support upon which is placed the sub support, a refractory ring which is elevating on the border forming the bottom of the reactor. The refractory support prevents radiation from damaging the metallic part placed beyond of the reactor as for example stainless steel ferrule.

Advantageously, the reactor comprises a peripheral seal above the catalyst.

The support of the catalyst is the preferably a ceramic foam produced from $Al_2O_3$ and preferably a high purity alumina with preferably more than 99.6% mass of alumina; or from mullite ($Al_2O_3+SiO_2$) with preferably a ratio of 60% to 75% mass of $Al_2O_3/(Al_2O_3+SiO_2)$ and a high purity of mullite with preferably more than 99.6% mass of mullite.

According to another feature of the invention, the refractory support comprises a cone shaped refractory support comprising a plurality of flow channels for the reaction products, the base of said cone shaped support being placed under the porous sub support of catalyst. The conical shape of the refractory support leads to differential pressure drop depending on gas attack place. This arrangement involves a better distribution on the overall surface of the catalyst.

Advantageously, the porous sub support for the catalyst comprises a first porous sub support and a second porous sub support, both being preferably ceramic sub supports of preferably alumina or mullite.

According to another feature of the invention, the catalyst comprises catalyst gauzes based on platinum/rhodium gauzes.

Advantageously, the porous sub support is preferably a ceramic produced from $Al_2O_3$ and preferably a high purity alumina with preferably more than 99.6% by weight of $Al_2O_3$ or mullite ($Al_2O_3+SiO_2$) with preferably a ratio of 60% to 75% mass of $Al_2O_3/(Al_2O_3+SiO_2)$ and a high purity of mullite with preferably more than 99.6% mass of mullite.

Advantageously, first porous sub support and second sub support comprise a bed of slotted bricks of $Al_2O_3$. And advantageously, the refractory cone shaped refractory support is made of refractory concrete.

Another aims of the invention is to propose an equipment for preparing hydrogen cyanide (HCN) comprising a reactor as disclosed above.

According to another feature of the equipment, the equipment for preparing hydrogen cyanide comprises a static mixer designed to homogenize the composition of the reactant gases mixture before its introduction into the reactor. The static mixer is placed on the line going to the inlet of the reactor. By placing such a static mixer on the line going to the inlet of the reactor, said static mixer improves homogenization of the gas mixture and improved the yield. The static mixer and the conic shape of the reactor upward the catalyst lead to low pressure drop.

According to another feature of the equipment, the equipment comprises also a filtration device placed on the inlet of the reactor. Such filtration devices on gas stream allows to avoid pollution from upstream pipes, of reactor and its catalyst, by removing solid particles, like iron for example, which is a precursor of coke.

According to another feature of the invention, the equipment for preparing hydrogen cyanide comprises a heat exchanger placed under the reactor and comprising tubes bundles forming the outlet for the reaction products. The heat exchanger is located under the conical shaped refractory support, both comprising facing faces with a complementary shape.

Advantageously, the flow channels of the refractory support of the reactor and the tubes of the heat exchanger are coaxial and coaxial to the axis XX' of the reactor.

According to another feature of the equipment, the equipment comprises a cooling device including a boiler drum providing boiling water under pressure as coolant for cooling down the reactive gas mixture, an inlet for the cooling water located at the bottom of the heat exchanger and an outlet of hotter water located at the top of the heat exchanger and a circulation loop between the outlet and the boiler drum until the inlet of the heat exchanger.

According to another aspect, the invention relates to a process for preparing hydrogen cyanide by Andrussow process in which a reactor or an equipment disclosed above are used.

Advantageously, according to the process of the invention, the reactant gases mixture at the inlet of the reactor have a temperature comprised between 95 and 115° C.

Advantageously, according to the process of the invention, the flow rate of the reactant gases mixture at the inlet of the reactor is higher than a predetermined threshold value, which depends on a flame velocity. The flame velocity depends on the gas composition, the temperature of the gas, the pressure of the gas and the inlet line diameter.

INTRODUCTION OF THE FIGURES

Figure 2:
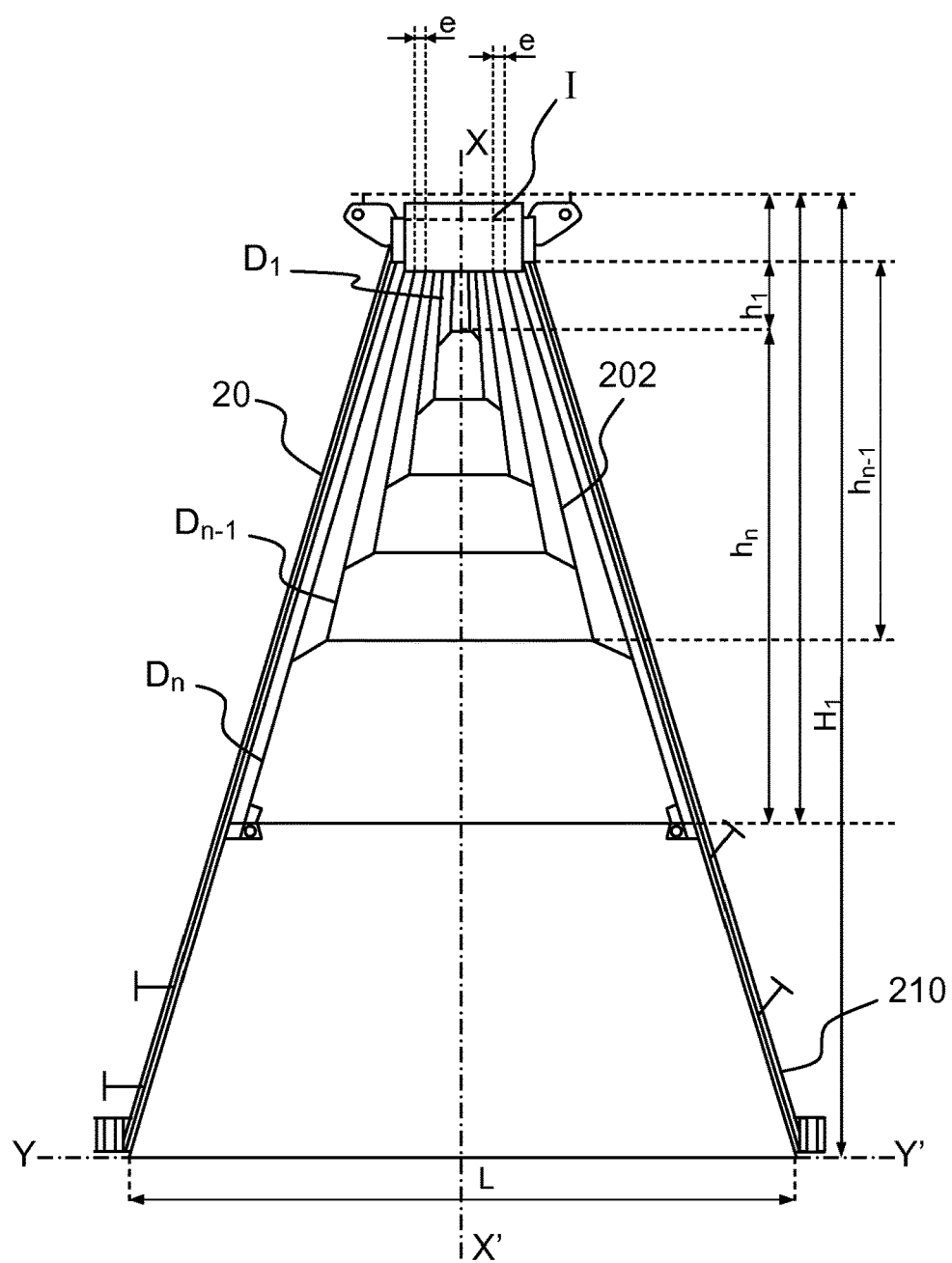
Figure 3:
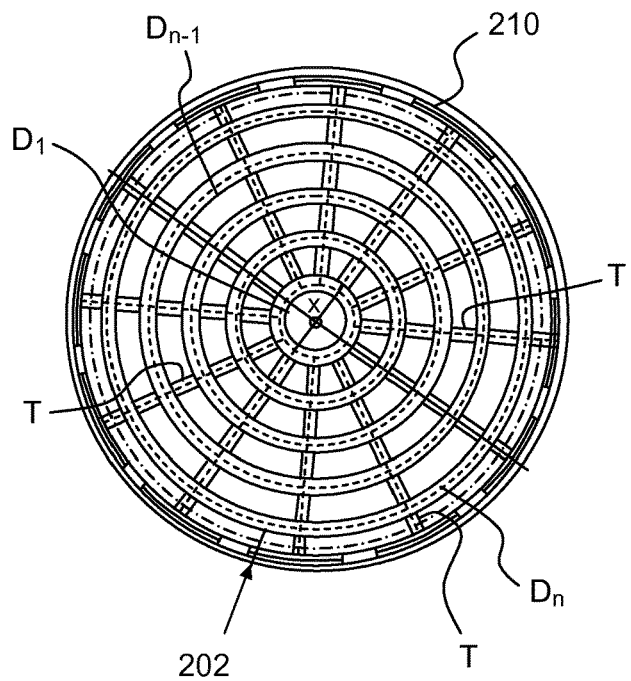
Figure 4:
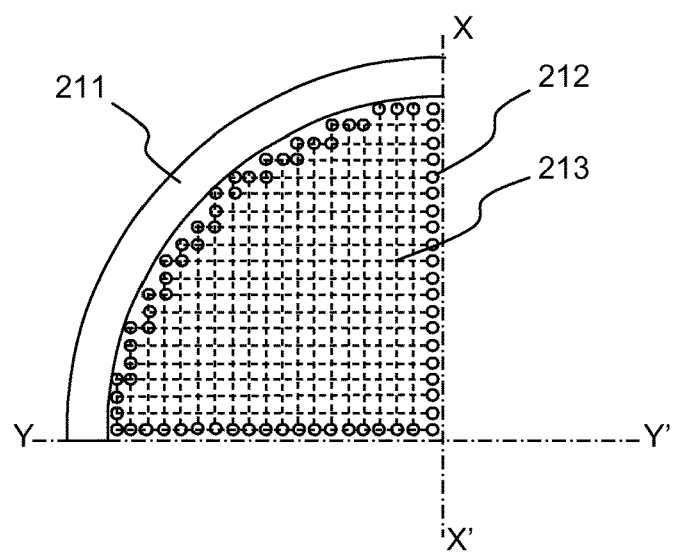

Other features and advantages of the invention will become apparent by reading the following description given by way of illustrative and non-limiting examples, with reference to the accompanying Figures in which:

FIG. 1 represents a schematic view of a reactor according to the invention, and of an equipment for preparing hydrogen cyanide (HCN) by the Andrussow process, using said reactor, FIG. 2 represents a schematic view a preferred embodiment of the gas distributor 202, FIG. 3 represents a schematic view of the bottom of the gas distributor 202 according to FIG. 2, FIG. 4 represents a simplified schematic section of the heat exchanger 211.

SPECIFICATION

The terms "top", "upper" or "above" and "down", "bottom", or "below" are used to define element of the reactor and of the equipment with respect to the vertical axis XX'.

The terms "upstream" and "downstream" are defined relative to the direction of the gas flowing through the devices.

The equipment 200 according to the invention comprises the Andrussow type reactor 201 having an overall conical shape and given precisely by the cone frustum shaped metallic or ceramic casing 210 of said reactor of a predetermined hight H1. This equipment is represented on FIG. 1.

Inside of its casing 210, the reactor 201 comprises the gas distributor 202, the catalyst 203 constituted by a pack of disc of Platinum/Rhodium catalyst gauzes, the porous support 204 and a peripheral seal 220 above the catalyst, the porous sub support which comprises preferably the first and the second porous sub support 205 and 206; the sub support 205 and 206 being under the support 204, the ring 216 which is elevating on the border forming the bottom of the reactor and, the cone shaped refractory support 207 which comprises the plurality of flow channels 208 for the reaction products. The refractory support 207 is below the second porous sub support 206.

The reactor 210 comprises outside the cooling water jacket 209. This cooling jacket 209, preferably a double wall cooling, is around the metallic or ceramic casing 210 of the reactor thereby protecting this metallic or ceramic casing of the reactor from catalyst radiance.

The gas distributor 202 comprises at least one cone frustum element D1 having a top base directed towards the gas inlet I. Preferably the gas distributor 202 comprises at least two cone frustum elements D1 and D2 having a top base directed towards the gas inlet I.

In a more preferred embodiment the gas distributor 202 illustrated on FIGS. 2 and 3, is formed of a plurality of coaxial cone frustum elements D1, D2, . . . , Dn−1, Dn being arranged around each other. The diameter of the bottom base of the central cone frustum element D1 is d1 and its height is h1, the diameter of D2 is d2 and its height is h2, the diameter of Dn−1 is d(n−1) and its height is h(n−1), and the diameter of Dn is dn and its height is hn so that h1<h2<<hn−1<hn. The value of n is from 2 to 20, preferably from 2 to 15. Indeed, the bottom base of each element is increasing viewed in the direction XX' of gas flow. The cone frustum elements are fixed to each other and to the casing of the reactor by wedges T so as to be spaced by a predetermined distance e-contributing to obtaining the gas distribution preferably e being comprised between 25 mm to 110 mm.

Preferably the cone frustum elements D1, D2, . . . , Dn−1, Dn according to the invention are not perforated.

The porous support 204 for the catalyst is ceramic preferably a ceramic foam.

The peripheral seal 220 forms a peripheral ring pressed against the refractory ring 216 and located above the catalyst 203.

Catalyst 203 and porous support 204 are placed on the porous sub support 205-206 consisting of a bed of ceramic bricks and consisting preferably of a first and second bed of slotted bricks of ceramic and preferably of $Al_2O_3$ or mullite ($Al_2O_3+SiO_2$). The bricks are preferably independent.

Both support 204 and sub support 205-206 are ceramic or mullite of high purity, that is to say that $Al_2O_3$ or ($Al_2O_3$+

SiO$_2$) represent more than 99.6% by weight and that the total concentration of all other impurities (oxides of sodium, potassium, calcium, manganese, iron, zirconium, . . . ) should be preferably less than 0.4%.

The ring 216 which is elevating on the border forming the bottom of the reactor is a refractory material, preferably refractory concrete.

The reactor comprises the cone shaped refractory support 207 preferably refractory concrete support comprising the plurality of flow channels 208 for the reaction products. The base of said cone shaped support 207 is placed under the sub support 206 and consequently below the sub porous support 205 and below the porous support 204 of the catalyst 203 and a fortiori below the catalyst.

The reactor comprises the safety device to avoid internal overpressure which is advantageously constituted by a rupture disk 215 and the outer pipe P0. The rupture disk 215 is placed above the input of the reactor, preferably at the end of the outer pipe P0. The outer pipe P0 is connected to the feeding pipe P7. The rupture disk 215 is preferably set for a maximum pressure of 0, 5 to 3 bar over the operating pressure of the reactor.

The reactor comprises the cooling water jacket 209 around the metallic casing 210 of the reactor allowing a protection of the metallic casing of the reactor from catalyst radiance. Cooling water is introduced on the bottom of the base of the jacket by the inlet E1 and goes out from the outlet S1.

In the preferred embodiment described below, the catalyst is formed by a pack of Platinum/Rhodium catalyst gauzes, the pack comprises for example 12-26 layers and preferable 15-24 layers.

Gauzes of catalyst 203 lay over the porous support 204 which is ceramic preferably of alumina (Al$_2$O$_3$) or mullite (Al$_2$O$_3$+SiO$_2$).

As represented on FIG. 1 and detailed FIG. 4, the equipment comprises the heat exchanger 211 of predetermined hight H2 with a body 213 comprising a cooling water circuit 219 (partially represented). The heat exchanger 211 is placed under the reactor ie under the cone shaped refractory support 207 and comprises tubes bundles 212 located into exchanger's body 213, these tubes 212 are forming the outlet for the reaction products. The flow channels of the refractory support 207 and the tubes of the heat exchanger are coaxial, ie the outlet of the flow channels 208 match with the inlet of the tubes bundles 212.

The equipment 200 comprises the cooling device 214. This cooling device comprises the boiler drum 218 providing boiling water under pressure as coolant for cooling down the reactive gas mixture which has a temperature above 750° C., and the circulation loop 219 between the outlet B of the heat exchanger and the boiler drum until the inlet A of the heat exchanger. The inlet A for the water designated for cooling is located at the bottom of the heat exchanger 211 and the outlet B of hotter water is located at the top, said heat exchanger.

The cooling device 214 is provided to introduce boiling water under pressure as coolant, into the heat exchanger 211. The cooling device 214 is connected to the inlet A of the heat exchanger for providing the boiling water under pressure. The inlet A for boiling water is at the bottom of the body 213 and an outlet B supplying heated water is at the top of the body 213. The cooling device 214 is arranged to create a thermosyphon liquid water flow and to avoid hot points on the tubes located into the body. The cooling device 214 comprises boiler drum 218 and a water circulation loop between the output B and the inlet A.

The cooling device 214 for the heat exchanger 211 has no elements in common with the cooling jacket 209 of the casing 210.

Moreover the equipment comprises the static mixer 230 designed to homogenize the composition of the reactant gases mixture before its introduction into the reactor 201 and the filtration device 231 placed on the inlet I of the reactor 201.

Advantageously, in the present invention, the air is enriched with pure O$_2$ to reach 30.5% vol. of O$_2$ in air. By the means of this enrichment, global performances are improved (mainly HCN/CH4 yield), and size of all equipments of the process, not only the reaction but also downward, are reduced.

The gas mixture enters at the top of the synthesis reactor 201 and precisely is introduced by the inlet I and goes inside where there is the gas distributor 202. The synthesis reaction takes place in the short contact time with the catalyst gauzes 203 (platinum-rhodium) at a temperature of 750° C. to 1250° C. preferable between 1000° C. and 1200° C. and a pressure of 1.4 to 3 bar absolute and preferably between 2.2 to 2.6 bar absolute. The reactor 201 is jacketed by the cooling jacket water 209 with preferably demineralized water to maintain temperature of the cone frustum shaped metallic casing 210 and to protect said metallic casing. The rupture disc 215 is located above the input of the reactor and protects the structure against internal overpressure.

The gas mixture leaving the reactor 201 by means of the output P8 is made up of: Hydrogen cyanide, Water, Carbon monoxide, Carbon dioxide, Hydrogen, Nitrogen, and some raw material which did not react (molecules from air, O2, CH4, NH3). The gas mixture flows across the body 213 of heat exchanger 211 by means of the tubes 212 to be cooled and to recover the thermal energy released by HCN reaction, and produce steam. Reaction gas is in tubes side 212. Degassed water is in body side 213. The temperature of gas decreases from a range between 1000° C. and 1200° C. to a range between 190° C. to 240° C. The tubes bundles 212 and then the boiler drum 218 are as close as possible from the catalyst gauzes 203 to quench quickly the gas mixture, avoiding HCN cracking at high temperature. At the reaction gases side, the rupture disc 215 avoids any problem of over pressurizing.

Pressurized water is circulating by thermosyphon effect from heat exchanger 211 to drum 218.

According to another aspect the process, the resultant mixture of reactant gases flowing in the feeding pipe P7 of the reactor 201 shall have a controlled flow rate. Indeed, the flow rate of this mixture has to be higher than a minimum threshold value in order to avoid a backfire from the catalyst gauzes of the reactor, whose temperature is more than 1000° C. Thus, the flow rate in the feeding pipe P7 before entering the reactor has to be higher than a predetermined threshold value, which depends on a flame velocity. Such flow rate of the resultant mixture enables to have a gas velocity greater than the speed of flame from the reactor. All gases are mixed in a single pipe P7 and flow across the static mixer 230, which homogenizes the composition of the mixture before feeding the reactor 201.

The static mixer 230 is advantageously disposed on the feeding pipe, referenced P7, of the reactor 201, in order to homogenize the composition of the resultant reactant gas mixture, before its entry into the reactor 201. Such a homogenized composition, of the mixture of resultant reactant gas, avoids a local detonation point.

The resulting reactant gases mixture is also filtered by the filtration device 231. Such filtration devices on each gas stream allows to avoid pollution from pipes, of downstream process devices, like the reactor 201 and its catalyst gauzes, by removing solid particles, like iron for example, which is a precursor of coke. After the filtration 231, the gas mixture is sent to the reactor 201 for the synthesis of hydrogen cyanide HCN, at a temperature around 1000° C.-1200° C. and between 1.2 and 1.4 barg.

Concerning the Preparation of HCN with Described Equipment

For a better comprehension, it is remind that Andrussow process is widely used for HCN synthesis by ammoxidation of methane. The process is auto-thermal and involves the reaction of air, methane preferably from natural gas and ammonia over a catalyst at a temperature going over 1000° C. and a pressure between 2.2 bar absolute and 2.6 bar absolute. The reaction is globally exothermic.

First of all HCN is produced, from a mixture of methane-containing gas, ammonia and oxygen-enriched air. A mixture of reactant gases is prepared and introduced into Andrussow type reactor 201 comprising catalyst gauzes based on platinum/rhodium gauzes. Mixture of gases passes over the catalyst gauzes and reacts at a temperature around 1000° C.-1200° C. to form HCN. The oxygen-enriched air enables to increase the productivity and to reduce the methane consumption. The HCN produced by the equipment according to the present invention is quickly cooled and treated so as to avoid polymerization of HCN. For that, ammonia which has not reacted is absorbed by reaction with sulphuric acid, and the HCN is absorbed and stabilized in an absorption column, and then distilled in a distillation column to reach a purity of 99.5% wt.

The invention claimed is:

1. Reactor for preparing hydrogen cyanide by the Andrussow process, with at least one gas inlet for reactant gases mixture, a catalyst, at least one support for the catalyst and at least one outlet for the reaction products, wherein said reactor (201) comprises a cone frustum shaped casing (210) and comprises inside said casing, a gas distributor (202) located between a gas inlet (I) and a catalyst (203), said distributor comprising at least one cone frustum element (Dn) having an upper base directed towards the gas inlet and wherein the gas distributor comprises a plurality of coaxial cone frustum elements (D1, . . . , Dn) being arranged around each other with a central cone frustum element having a height h1, an outer cone frustum element having an height hn, and intermediate elements having respectively height h2, . . . , h(n−1), where h1 is smaller than h2, and respectively h(n−1) is smaller than hn.

2. Reactor for preparing hydrogen cyanide by the Andrussow process according to claim 1, wherein said reactor (201) is a cone frustum shaped with cylindrical bases.

3. Reactor for preparing hydrogen cyanide, according to claim 1, wherein said reactor comprises a safety device (215, P0) to avoid internal overpressure.

4. Reactor for preparing hydrogen cyanide, according to claim 3, wherein the safety device comprises a rupture disk (215) and an outer pipe (P0), the rupture disk being located at the end of the outer pipe (P0), said outer pipe being connected above the gas input of the reactor.

5. Reactor for preparing hydrogen cyanide according to claim 1 wherein said reactor further comprises a cooling water jacket (209) around the casing of the reactor to protect casing of the reactor from catalyst radiance.

6. Reactor for preparing hydrogen cyanide according to claim 1 wherein the reactor comprises, a porous support (204) for the catalyst (203) and a porous sub support (205, 206) upon which are placed the porous support (204) and the catalyst (203), a refractory ring (216) which is elevating on the border forming the bottom of the reactor and a refractory support (207) upon which is placed the porous sub-support.

7. Reactor for preparing hydrogen cyanide according to claim 6 wherein the refractory support (207) is a cone shaped refractory support (207) comprising a plurality of flow channels (208) for the reaction products, the base of said cone shaped support being placed under the first porous support of catalyst.

8. Reactor for preparing hydrogen cyanide according to claim 1 wherein, the catalyst comprises catalyst gauzes based on platinum/rhodium gauzes.

9. Reactor for preparing hydrogen cyanide according to claim 1 wherein the porous support (204) for the catalyst is a foam ceramic produced from $Al_2O_3$ more than 99.6% by weight of alumina; or from mullite ($Al_2O_3+SiO_2$) with a ratio of 60% to 75% mass of $Al_2O_3/(Al_2O_3+SiO_2)$ and with a high purity of mullite with more than 99.6% mass of mullite.

10. Reactor for preparing hydrogen cyanide according to claim 9, wherein the porous sub support comprises a first porous sub support and second porous sub support, said first and second sub supports being a ceramic produced from $Al_2O_3$ with more than 99.6% by weight of alumina; or from mullite ($Al_2O_3+SiO_2$) with a ratio of 60% to 75% mass of $Al_2O_3/(Al_2O_3+SiO_2)$ and a high purity of mullite with more than 99.6% mass of mullite.

11. Reactor for preparing hydrogen cyanide according to claim 6 wherein the porous sub support (205-206) comprises a bed of slotted bricks of $Al_2O_3$.

12. Reactor for preparing hydrogen cyanide according to claim 7, wherein said refractory cone shaped support (207) is made of refractory concrete.

13. Reactor for preparing hydrogen cyanide according to claim 1 wherein said reactor comprises a peripheral seal (220) above the catalyst.

* * * * *